Nov. 27, 1956    R. O. BRADLEY ET AL    2,772,383
TEMPERATURE COMPENSATED SERVO COILS
Filed Dec. 30, 1952
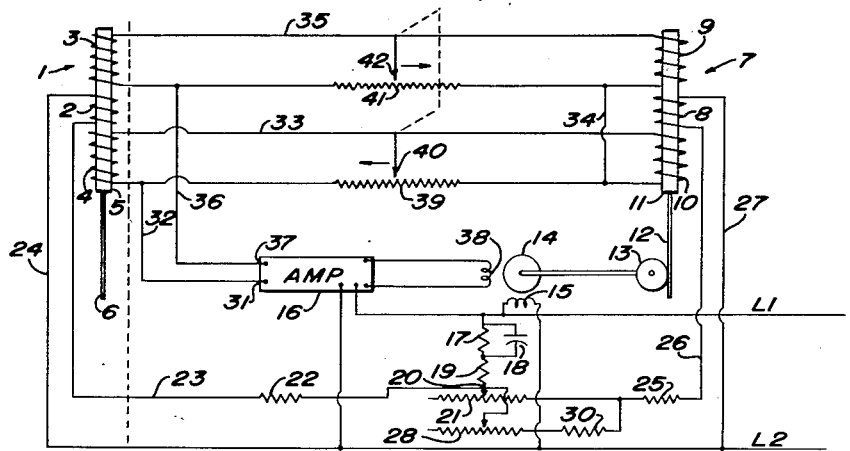
Fig. I
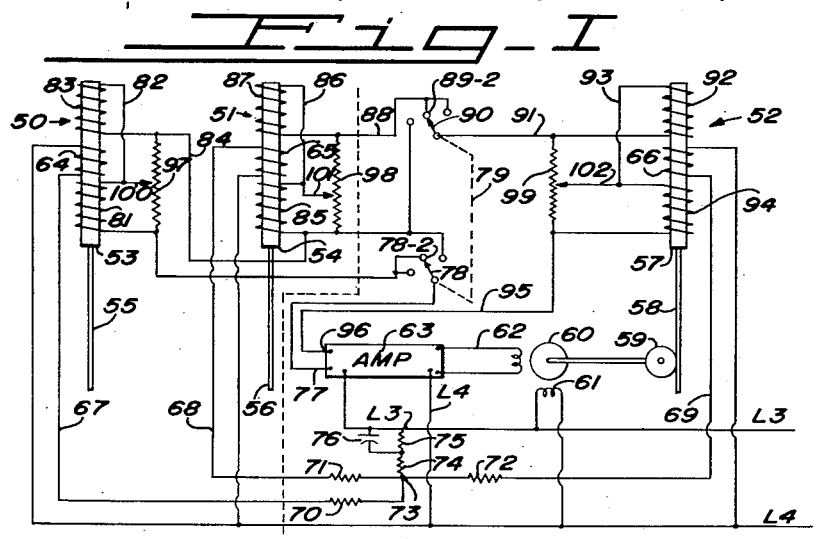
Fig. II
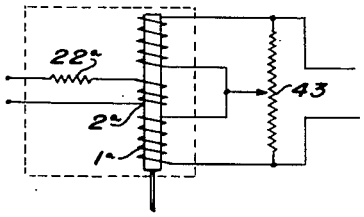
Fig. III
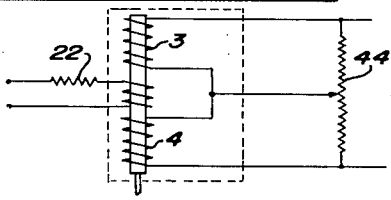
Fig. IV
INVENTORS
ROBERT O. BRADLEY
CLARENCE S. SIMONDS
BY C. HAROLD JACOBS
ATTORNEYS United States Patent Office 2,772,383
Patented Nov. 27, 1956

2,772,383

TEMPERATURE COMPENSATED SERVO COILS

Robert O. Bradley, Clarence S. Simonds, and Charles Harold Jacobs, Toledo, Ohio, assignors to Toledo Scale Company, Toledo, Ohio, a corporation of New Jersey Application December 30, 1952, Serial No. 328,619

2 Claims. (Cl. 318—28)

This invention relates to electrical equipment for transmitting data from one location to another and in particular to circuit arrangements and equipment for minimizing the effects of temperature on the transmission of data and for providing adjustment to secure minimum errors in the transmission of data.

Electrical systems including movable-core differential transformers have been used for the transmission of data from one location to another. Such transformers have the property that their output voltages vary according to the positions of the movable cores relative to the windings of the transformer. Thus when two transformers are arranged one at a transmitting station and one at a receiving station and are suitably electrically interconnected the position of the core of the transmitting transformer may be indicated by the relative position assumed by the core of the receiving transformer when the electrical voltages in the secondary circuit of the transformers are balanced to a minimum. The accuracy of such data transmitting systems has been found to be adversely affected by temperature changes and the systems are difficult to adjust if high accuracy of indication is required.

The principal object of this invention is to provide a data transmitting system employing differential transformers that is capable of precise adjustment.

Another object of the invention is to provide a data transmitting system in which the effect of temperature on the accuracy of indication is minimized.

A still further object of the invention is to provide a differential transformer and associated circuit arranged so that the voltage transformation ratio of the transformer is substantially independent of temperature.

More specific objects and advantages are apparent from the following description of several circuits arranged according to the invention.

According to the invention adjustable resistors are connected in parallel with the secondary windings of each of the differential transformers and means are provided for simultaneously adjusting two or more of such resistors to secure substantially equal voltage changes per increment of travel of the cores of the transformers, particularly near each limit of the stroke of the cores of the transformers. The effect of temperature is minimized by including in series with or as part of the primary winding of each transformer a resistor that is either maintained at a constant temperature or the resistance of which does not change with temperature. By properly dividing the resistance of the primary circuit of each transformer between the resistance of the winding and the resistance of the added resistor the ratio of output voltage to supply voltage of the transformer may be made substantially independent of temperature.

Several circuits employing the invention are illustrated in the accompanying drawings.

In the drawings:

Figure I is a schematic diagram of a data transmitting system including a pair of differential transformers and an electrically controlled motor for positioning the core of the receiver transformer to balance the voltages in the secondary circuits of the transformers.

Figure II is a similar schematic diagram in which the algebraic sum of the displacements of two transmitting transformers is indicated by a receiving transformer.

Figure III is a schematic diagram of a transformer in which the resistance of the temperature compensating resistor is independent of temperature and is located adjacent the transformer.

Figure IV is a similar circuit except that the temperature compensating resistor is located remotely from the transformer.

These specific figures and the accompanying description are intended merely to illustrate the invention but not to impose limitations on its scope.

The data transmitting system embodying the invention comprises a first linear differential transformer 1 having a primary winding 2, secondary windings 3 and 4, and a movable core 5 which is connected through a stem 6 to a driving member the position of which is to be remotely indicated. A similar differential transformer 7, located at a receiving station, comprises a primary winding 8, secondary windings 9 and 10, and a movable core 11 that is operatively connected through a stem 12 and drive member 13 to a motor 14.

Alternating current power supplied through leads L1 and L2 serves to energize a motor field winding 15 of the motor 14 and an amplifier 16. The primary windings 2 and 8 of the differential transformers are also energized from the power lines L1 and L2 through a circuit that includes a parallel combination of a resistor 17 and a condenser 18, a series resistor 19 that is connected to a movable contact 20 of a variable resistor 21. From the movable contact 20 the current divides part of it going through a temperature compensating resistor 22 and lead 23 to the primary winding 2 of the differential transformer 1 and through a return lead 24 connected to the line L2. From the movable contact 20 of the variable resistor 21 current flows through the right half of the variable resistor 21, a second temperature compensating resistor 25, lead 26, primary winding 8 of the differential transformer 7, and a lead 27 connected to the return lead L2. The two primary windings 2 and 8 of the differential transformers 1 and 7 are thus connected in parallel to a voltage source including the lines L1 and L2 and the series resistors 17 and 19 and each primary winding is itself in series with a temperature compensating resistor. One primary circuit includes the portion of the variable resistor 21 which may be adjusted to vary the ratio of the primary currents in the two transformers.

To allow the ratio of current to be varied by extremely small steps a second variable resistor 28 with a series resistor 30 is connected in parallel with the first variable resistor 21, the two movable contacts being connected together so that the variable resistor 21 serves as a coarse control while the second variable resistor 28 serves as a fine control.

The secondary windings of the differential transformers 1 and 7 are connected in a series circuit which may be traced from a first terminal 31 of the input to the amplifier 16, through a lead 32, the secondary winding 4 of the transformer 1, a lead 33, the secondary winding 10 of the transformer 7, a lead 34, the secondary winding 9 of the transformer 7, a lead 35, the secondary winding 3 of the first differential transformer 1, and a lead 36 connected to a second input terminal 37 of the amplifier 16. The polarities of the secondary windings in following the series circuit are such that when the voltages of the secondary windings 4 and 9 are positive the voltages of the remaining secondary windings 10 and 3 are negative Thus each winding of each transformer is in phase opposition to the other secondary winding of the same transformer and to the corresponding winding of the other transformer. For example, the secondary winding 4 of the first transformer 1 is in voltage opposition to the secondary winding 3 of the same transformer and the coresponding winding 10 of the other transformer 7.

The net voltage in the series circuit of secondary windings is amplified by the amplifier 16 and applied to a control winding 38 of the motor 14. The characteristics of the amplifier and the polarity of the net voltage are such that the motor 14 tends to drive the movable core 11 of the transformer 7 in a direction that tends to reduce the net voltage and at a speed that is generally proportional to the magnitude of the net voltage. Since the net voltage, the difference in voltage of the two secondary windings, is generally proportional to the displacement of the movable core from a central position the motor 14 stops when it has positioned the movable core 11 at a point which corresponds to the position of the core 5 and thus indicates the position of the core 5. Adjustment of the proportionality factor, i. e. the travel of the core 11 for a given displacement of the core 5, may be adjusted over a limited range by adjustment of the variable resistors 20 and 28 which varies the primary currents in the second transformer 7 and thus the voltage output of its secondary windings for given displacement of its core.

It has been found that unavoidable differences between individual differential transformers causes the transmitted indication to vary from the true indication at various positions of the cores. Errors resulting from these differences may be reduced by adding resistors in parallel with each of the secondary windings and by simultaneously adjusting these resistors. It has been found that satisfactory results can be obtained by simultaneously varying all of the resistors to increase the resistance across a first pair of windings that are in series aiding relation while decreasing the resistance across the other pair of windings. As shown in Figure I a variable resistor 39 having its sliding contact 40 connected to the lead 33 is connected between the leads 32 and 34 so that the left portion of the resistor 39 is in parallel with the secondary winding 4 while the right portion of the resistor is in parallel with the secondary winding 10. Likewise a variable resistor 41 is connected between the leads 34 and 36 with its sliding contact 42 connected to the lead 35. The left portion of the resistor 41 is thus in parallel with the secondary winding 3 while the right portion is in parallel with the secondary winding 9. As indicated in the drawing, the sliding contacts 40 and 42 are mechanically interconnected to simultaneously move in the direction of the arrows.

The temperature compensating resistors 22 and 25 and the secondary loading resistors 39 and 41 were found to be necessary in order to secure high accuracy transmission of data represented by the positioning of the cores 5 and 11. These elements added to the circuit employing the differential transformers make it possible to position the receiving differential transformer core 11 according to the position of the transmitting differential transformer core 5 with an error not exceeding 1/10 of one percent of the range of travel of the cores.

Without the added elements the receiver transformer core could be positioned within one percent but considerable error in positioning occurred whenever the two transformers, transmitter and receiver, were operated at different temperatures. Upon further investigation it was discovered that the mutual coupling of the transformers, i. e. the ratio of secondary voltage to primary current for a given position of the core, increased as the temperature of the transformer increased. This increase, however, is not as great as the increase in ohmic resistance of the primary winding as the temperature increases. This effect was discovered after it was observed that the output voltage of a differential transformer exposed to an elevated temperature increased relative to the receiving transformer when the primaries were connected in series, i. e. carrying the same current, while the output voltage of the transformer at elevated temperature decreased relative to the receiver transformer when the primary coils were connected in parallel.

The effect of temperature is substantially eliminated by adding in series with each primary winding a resistor the resistance of which is not affected by the temperature difference between the two transformers and making the ratio of the added series resistance to the resistance of the primary winding such that the decrease in primary current caused by the increase in its resistance is just compensated by the increase in mutual coupling in the transformer. The temperature compensation may be effected as shown in Figure III by including a temperature compensating resistor 22a either at the receiving station or at the transformer and making the resistor of a material having a zero or a very low temperature coefficient of resistance. Figure III shows such a resistor located adjacent the transformer 1a.

As shown in Figures I and IV the temperature compensating resistor may be located remotely from the transformer in which case, resistors having appreciable temperature coefficients of resistance may be employed provided that all of the compensating resistors are kept at the same temperature.

As shown in Figure I those portions of the circuit physically located at the receiving station are shown at the right of the vertical dotted line while the transmitting transformer is shown to the left of that line.

The temperature compensation of the circuit shown in Figure I is independent of the impedance of the source of power as viewed from the movable contact 20 of the variable resistor 21. Thus it is immaterial whether the point 29 of the circuit be connected to a transformer tap at a suitable voltage or whether it be connected through a resistance circuit as shown. A transformer tap represents a low impedance source of power while the resistance circuit has a relatively high impedance. In the arrangement shown the condenser 18 in parallel with part of the resistor supply circuit serves to advance the phase of the primary current relative to the voltage on the lines L1 and L2 so as to secure proper phase relations of the currents of the motor windings 15 and 38.

Comparing Figures III and IV with Figure I it will also be noted that secondary loading resistors 43 and 44 are arranged to parallel the two secondary windings of an individual transformer while in Figure I each of the variable resistors 39 and 41 are in parallel with corresponding windings of the two transformers. As far as the results are concerned the circuits are equivalent because as will be noted in Figure I the left portions of the resistors 39 and 41 are varied in opposite directions during adjustment thus corresponding to the adjustments provided in the resistors 43 and 44 of Figures III and IV.

The compensating adjustments for differential transformer systems may be also used in systems embodying three or more transformers. Usually such systems are arranged so that the sum or difference of the motions of two of the differential transformer cores is matched by the motion of a single core in a third transformer. Such a circuit is shown in Figure II. In this arrangement a pair of transmitting transformers 50 and 51 cooperate either singly or together with a receiving transformer 52. The transmitting transformers 50 and 51 have movable cores 53 and 54 respectively that are actuated, through stems 55 and 56, by devices or members whose positions are to be indicated. A movable core 57 of the receiver transformer 52 is operatively connected through a stem 58 and drive mechanism 59 to a motor 60 having a first winding 61 connected directly to power lines L3 and L4 and having a control winding 62 energized from an amplifier 63.

The transformers have primary windings 64, 65, and 66 each of which has one lead connected to the power line L4 and which have their other terminals connected through leads 67, 68 and 69 respectively to temperature compensating resistors 70, 71 and 72. The temperature compensating resistors, one in series with each primary winding, are interconnected at a junction 73 which is connected through resistors 74 and 75 to line L3. The resistor 75 is by-passed by a condenser 76 to obtain proper phase relation at the output of the amplifier 63 to drive the motor 60. Secondary windings of the transformers 50, 51, and 52 are connected in series circuit that may be traced from an input terminal 77 of the amplifier 63 through a movable contact 78 of a two-section, three position switch 79, a fixed contact 78–2, of the switch, a lead 80, a first secondary 81 of the transformer 50, a lead 82, a second secondary 83 of the transformer 50, a lead 84, a first secondary 85 of the second transformer 51, a lead 86, a second secondary 87 of the second transformer 51, a lead 88, a fixed contact 89–2 of the switch 79, a movable contact 90 of the switch 79, a lead 91, a second secondary 92 of the receiver transformer 52, a lead 93, a first secondary 94 of the receiver transformer 52 and a lead 95 connected to a second input terminal 96 of the amplifier 63. The polarity of the windings in this secondary circuit is such that the first secondary windings 81 and 85 of the transformers 50 and 51 are in opposition to the second secondary windings of these transformers and to the first secondary winding 94 of the receiving transformer 52. Likewise the two secondary windings on any transformer are in opposition to each other. Thus in the series circuit of secondary windings, the output voltage of the transmitting transformers 50 and 51 is opposed by the output voltage of the receiving transformer 52 and the difference or net voltage is applied to the amplifier 63 to cause the motor 60 to run in a direction to move the movable core of the receiver transformer until the voltages are matched. Adjustments for linearity are effected by load resistors 97, 98 and 99 connected in parallel with the secondary windings of each of the transformers and having sliding contacts 100, 101 and 102 respectively arranged so that the resistance across the individual secondaries may be varied in equal and opposite amounts. In this circuit, as in the first, the temperature compensating resistors 70, 71 and 72 are adjusted to secure a balance between the temperature coefficient of mutual coupling in each of the transformers and the overall temperature coefficient of resistance of each primary circuit.

If the switch 79 is turned to the left the secondaries of the second transmitting transformer 51 are removed from the circuit so that the core 57 follows the motion of the core 53. Likewise, if the switch is turned to the right the secondaries of the first transmitting transformer are removed from the circuit so that the receiver core 57 follows the movement of the core 53.

Depending upon the scale of the transformers the ratio of movements may be made equal or in any desired ratios. Thus, for example, it is possible to make the travel of the receiver core 57 equal to the sum of the travels of the transmitter cores 53 and 54, or it may be many times larger or smaller than the travel of the transmitter cores 53 and 54.

If necessary, suitable resistors similar to the adjustable resistors 21 and 28 may be added in the primary circuit shown in Figure II to adjust the relative magnitude of the primary currents and thus vary the displacement of the various movable transformer cores required to obtain electrical balance in the secondary series circuit.

The simultaneous adjustment of the loading resistors as shown in Figure I has the advantage that it is impossible to inadvertently overload the secondary windings by simultaneously decreasing the resistance in parallel with each winding of the transformer. In the primary circuit the adjustment is preferably confined to the receiver primary to avoid upsetting of the temperature coefficient adjustment.

Various modifications of the circuit and of various components therein may be made without departing from the scope of the invention.

Having described the invention, we claim:

1. In an electrical data transmitting system, in combination, a pair of differential transformers each having a primary and pair of secondary windings, a source of alternating current power, a circuit for energizing said transformers comprising a first resistor in series with a pair of branch circuits each including a resistor and one of said primary windings, said resistors being adjusted according to the temperature coefficients of said transformers, said secondary windings being connected in series circuit with each winding connected in voltage opposition to the other winding of the same transformer and to the corresponding winding of the other transformer, a movable core for each transformer, resistors connected in parallel with each of the secondary windings, and means for simultaneously increasing the resistance of the resistors connected in parallel with two of the windings while decreasing the resistance of the remaining resistors, whereby the net voltage of said series circuit may be maintained substantially at zero as said cores are moved proportionate distances from their midpositions.

2. In an electrical data transmitting system, in combination, a plurality of differential transformers each including a movable core, a primary winding and a pair of secondary windings, a source of alternating current power, said primary windings being connected in parallel to said source of power, a resistor in series with each primary winding, each resistor being arranged to maintain its resistance constant with change of temperature of that transformer subjected to varying temperature and being of a resistance value to compensate for temperature variations of the associated transformer, and a secondary circuit comprising said secondary windings connected in series with each winding in voltage opposition to the other winding of the same transformer and to the corresponding winding of another transformer, a resistor connected in parallel with each secondary winding, and means for simultaneously varying the resistance of at least two of the resistors, whereby the net voltage of said series circuit may be made to accurately indicate the difference in position of the movable cores throughout most of their range of travel.

References Cited in the file of this patent

UNITED STATES PATENTS

| | | |
|---|---|---|
| 2,336,492 | MacKay | Dec. 14, 1943 |
| 2,363,690 | Razek | Nov. 28, 1944 |
| 2,420,539 | Hornfeck | May 13, 1947 |
| 2,457,558 | Hornfeck | Dec. 28, 1948 |
| 2,558,708 | Macgeorge | June 26, 1951 |
| 2,615,936 | Glass | Oct. 28, 1952 |
| 2,640,971 | Macgeorge | June 2, 1953 |